Patented Sept. 10, 1935

2,013,670

UNITED STATES PATENT OFFICE 2,013,670

COMPOSITION FOR LINING CAN ENDS

John E. Robinson, Glen Ellyn, Ill., assignor to American Can Company, New York, N. Y., a corporation of New Jersey No Drawing. Application December 31, 1926, Serial No. 158,414

9 Claims. (Cl. 134—17)

This invention relates to compounds for lining can ends and the like, and has for its object broadly the provision of a compound lining material which may be readily dried in the can end to form a thoroughly satisfactory liner or gasket material of shortened characteristics, as contradistinguished from the elastic characteristics, of the rubber compounds generally in use prior to this invention. This application is a continuation in part of co-pending application Serial No. 9,512, filed February 16, 1925.

A highly important object is the elimination of benzol and other injurious solvents now generally employed in the compounds used for the lining of can ends and the like.

The invention contemplates in this regard the use of no solvent except water and the use of this in such fashion as to be practical and permit of thorough drying with simple drying equipment within reasonable time.

The commercial rubber compound in the past has required the use of benzol or other solvents dangerous to health and of inflammable character, as solvent for the rubber which constituted the principal ingredient of the compound. Effort has been made to use latex for the lining of can ends but it has been found to be of too elastic character and of other undesirable qualities and difficult of application to the can end itself, even when applied in a concentrated form, As an example of its undesirable characteristics, it may be mentioned that the lining produced from the latex has been found to absorb hot water and squeeze out of the seam in the double seaming operation.

In accordance with the present invention, a body of relatively inert and inelastic character is incorporated with the latex and a material is added to hold the body material, which is in finely divided insoluble condition, in proper dispersion in the liquid compound before drying in the can end. The dispersal agent is or may be a colloid adapted to distribute or disperse the filler uniformly throughout the latex and maintain it in suspension. The dispersal agent or colloid preferably, although not necessarily, is of a character to produce the desired viscosity in the liquid compound prior to its application to the can ends and preferably, although not necessarily also, it is of a water-proofing character. An example of a suitable colloid is an alginate, as for example ammonium alginate, although other colloids adapted to accomplish the desired dispersion and suspension of the filler are contemplated.

A preferred composition embodying the invention has been found to result from the use of calcined aluminum oxide as the body material and a product of alginic acid as the dispersing or dispersal agent. The alginic compound is an ammonium alginate, which does not combine readily with the aluminum oxide and which acts as a colloid to coat the calcined aluminum oxide particles to prevent conversion of the latex into irreversible rubber. An excess of ammonia is used to prevent premature coagulation of the latex and to maintain the alginate in its desired original condition throughout mixing, handling, and application to the can end.

A preferred and workable formula results from the use of two pounds of aluminum oxide; two pounds of alginate emulsified wax solution, and two pounds of latex. The strengths of the solutions of the alginate and the latex are determined by the consistency desired and a slight excess of ammonia is maintained. The compound is prepared by thoroughly mixing the alginates and the aluminum oxide in a ball mill or grinder and then adding and mixing in the latex. As the mixing operations proceed ammonia is added to maintain proper concentration of ammonia. The alginate is preferably fortified by the addition of a suitable fortifying agent, for example, a suitable amount of a wax, as beeswax, which is first saponified with ammonia and then mixed into the ammonium alginate. A formula for the alginate emulsified wax solution is as follows:

Water _____ 80%
Solids _____ 20% = Emulsified beeswax _____ 60%
            Ammonium alginate _____ 40%

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

1. A compound for lining can ends and the like, comprising a solid body material, a solution of latex and fortified ammonium alginate.

2. A compound for lining can ends and the like, comprising a suitable metal oxide, latex, and fortified ammonium alginate.

3. A compound for lining can ends and the like, comprising aluminum oxide, latex, and fortified ammonium alginate.

4. A compound for lining can ends and the like, comprising a body material, latex, an alkali alginate and fortified by saponified wax.

5. A compound for lining can ends and the like, comprising a body material, latex, an alkali alginate and saponified wax.

6. A compound for lining can ends and the like, consisting of a solid body material, a solution of latex, and a fortified algin salt.

7. A compound for lining can ends and the like, consisting of a solid body material, a solution of latex, and a fortified alkali alginate.

8. A composition for lining can ends and the like, consisting of a mixture of an alkali alginate, saponified wax, a filler, and latex.

9. A composition, consisting of an alginic material, saponified wax, latex, and an inert material.

JOHN E. ROBINSON.